US012219427B2

(12) United States Patent
Albada et al.

(10) Patent No.: US 12,219,427 B2
(45) Date of Patent: Feb. 4, 2025

(54) ELEVATION-AWARE HOTSPOT GENERATION SYSTEM

(71) Applicant: Uber Technologies, Inc., San Francisco, CA (US)

(72) Inventors: Michael Charles Albada, San Francisco, CA (US); Vivek Sankaravadivel, Fremont, CA (US); Saebra Lynn Waterstraut, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 722 days.

(21) Appl. No.: 17/446,903

(22) Filed: Sep. 3, 2021

(65) Prior Publication Data

US 2022/0078579 A1     Mar. 10, 2022

Related U.S. Application Data

(60) Provisional application No. 62/706,723, filed on Sep. 4, 2020.

(51) Int. Cl.
*H04W 4/024* (2018.01)
*G06F 18/22* (2023.01)
(Continued)

(52) U.S. Cl.
CPC ............ *H04W 4/024* (2018.02); *G06F 18/22* (2023.01); *H04B 17/318* (2015.01);
(Continued)

(58) Field of Classification Search
CPC ....... H04W 4/80; H04W 4/024; H04W 4/025; H04W 4/029; H04B 17/318; G06F 18/22
(Continued)

(56) References Cited

U.S. PATENT DOCUMENTS 6,237,500 B1    5/2001  Lund
6,363,324 B1    3/2002  Hildebrant
(Continued)

OTHER PUBLICATIONS

"U.S. Appl. No. 16/270,040, Non Final Office Action mailed Jun. 20, 2022", 27 pgs.
(Continued)

*Primary Examiner* — William Nealon
(74) *Attorney, Agent, or Firm* — Schwegman Lundberg & Woessner, P.A.

(57) ABSTRACT

Example embodiments are directed to systems and methods for generating and providing elevation-aware hotspots. In example embodiments, a network system detects an initiation of a request for a transportation service at a client device of a user and receives an indication of a location of the client device and corresponding signal strengths associated with the client device. The network system then determines a telematics vector based on the signal strengths associated with the client device. Based on the location of the client device and the telematics vector associated with the client device, the network system identifies one or more top ranked elevation-aware hotspots. A pickup point recommendation is then presented, by the network system on a user interface on the client device of the user, whereby the pickup point recommendation includes the one or more top ranked elevation-aware hotspots.

20 Claims, 6 Drawing Sheets

(51) Int. Cl.
  *H04B 17/318* (2015.01)
  *H04W 4/02* (2018.01)
  *H04W 4/029* (2018.01)
  *H04W 4/80* (2018.01)

(52) U.S. Cl.
  CPC ........... *H04W 4/025* (2013.01); *H04W 4/029* (2018.02); *H04W 4/80* (2018.02)

(58) Field of Classification Search
  USPC ...................................................... 455/456.1
  See application file for complete search history.

(56) References Cited

U.S. PATENT DOCUMENTS

| | | | |
|---|---|---|---|
| 6,856,897 | B1 | 2/2005 | Phuyal et al. |
| 7,035,733 | B1 | 4/2006 | Alwar et al. |
| 8,723,698 | B2 | 5/2014 | Davidson |
| 8,731,832 | B1 | 5/2014 | Davidson |
| 9,813,992 | B2* | 11/2017 | Peinhardt ............... G01S 5/0036 |
| RE46,991 | E | 8/2018 | Hildebrant |
| 10,167,645 | B2 | 1/2019 | Geiger |
| 10,424,202 | B1 | 9/2019 | Beaurepaire et al. |
| 10,490,073 | B2 | 11/2019 | Nordbruch et al. |
| 10,535,270 | B2 | 1/2020 | Lee et al. |
| 10,572,130 | B2 | 2/2020 | Kim et al. |
| 10,593,007 | B1* | 3/2020 | Long ..................... H04N 19/91 |
| 11,350,852 | B2 | 6/2022 | Bhimavarapu et al. |
| 11,574,262 | B2* | 2/2023 | Matthiesen ............. H04L 67/12 |
| 11,644,334 | B2 | 5/2023 | Chopra et al. |
| 11,761,772 | B2 | 9/2023 | Rolf et al. |
| 11,841,854 | B2 | 12/2023 | Panuganty et al. |
| 2003/0062463 | A1 | 4/2003 | Narita et al. |
| 2007/0143017 | A1 | 6/2007 | Reich |
| 2007/0146136 | A1 | 6/2007 | Chen et al. |
| 2008/0128508 | A1 | 6/2008 | Tsikos et al. |
| 2009/0043490 | A1 | 2/2009 | Jung |
| 2009/0286556 | A1 | 11/2009 | Yumoto et al. |
| 2010/0030471 | A1 | 2/2010 | Watanabe et al. |
| 2010/0082248 | A1 | 4/2010 | Dorum et al. |
| 2011/0082642 | A1 | 4/2011 | Magnussen |
| 2011/0172909 | A1 | 7/2011 | Kahn et al. |
| 2011/0238291 | A1 | 9/2011 | Bach |
| 2012/0135745 | A1 | 5/2012 | Kaplan |
| 2013/0238243 | A1 | 9/2013 | Sengoku et al. |
| 2014/0114567 | A1 | 4/2014 | Buchanan et al. |
| 2014/0142842 | A1 | 5/2014 | Knobel et al. |
| 2014/0309924 | A1 | 10/2014 | Varoglu et al. |
| 2015/0057926 | A1 | 2/2015 | Gupta et al. |
| 2015/0142253 | A1 | 5/2015 | Nolting et al. |
| 2015/0160328 | A1* | 6/2015 | Peinhardt .......... H04W 52/0251 455/456.3 |
| 2015/0241230 | A1 | 8/2015 | Davidson |
| 2015/0249907 | A1 | 9/2015 | Gupta et al. |
| 2015/0330779 | A1 | 11/2015 | Moeglein et al. |
| 2016/0078140 | A1 | 3/2016 | Chen |
| 2016/0187143 | A1 | 6/2016 | Colby et al. |
| 2016/0215753 | A1 | 7/2016 | Westmoreland |
| 2016/0272460 | A1 | 9/2016 | Simcik et al. |
| 2016/0275470 | A1 | 9/2016 | Straw et al. |
| 2016/0323711 | A1* | 11/2016 | Spears .................. H04W 4/023 |
| 2016/0377439 | A1 | 12/2016 | Dorum |
| 2017/0094477 | A1 | 3/2017 | Kusens et al. |
| 2017/0176601 | A1 | 6/2017 | Nara et al. |
| 2017/0193506 | A1 | 7/2017 | Karnati et al. |
| 2017/0211263 | A1 | 7/2017 | Sakai et al. |
| 2017/0217681 | A1 | 8/2017 | Tai |
| 2017/0278023 | A1 | 9/2017 | Rosen et al. |
| 2018/0189713 | A1* | 7/2018 | Matthiesen ............ G06Q 50/40 |
| 2018/0275277 | A1 | 9/2018 | Li et al. |
| 2018/0281815 | A1 | 10/2018 | Stentz |
| 2019/0028904 | A1 | 1/2019 | Carpenter et al. |
| 2019/0057599 | A1 | 2/2019 | Neumayer |
| 2019/0155973 | A1 | 5/2019 | Morczinek et al. |
| 2019/0180434 | A1* | 6/2019 | Sheth .................... G06T 7/0002 |
| 2019/0187706 | A1 | 6/2019 | Zhou et al. |
| 2019/0188602 | A1 | 6/2019 | Kwant et al. |
| 2019/0212737 | A1 | 7/2019 | Sonalker et al. |
| 2019/0258265 | A1 | 8/2019 | Wiacker |
| 2019/0313219 | A1 | 10/2019 | Zhu et al. |
| 2019/0371054 | A1 | 12/2019 | Young et al. |
| 2020/0023998 | A1 | 1/2020 | Pawluski |
| 2020/0033911 | A1 | 1/2020 | Moser |
| 2020/0049832 | A1 | 2/2020 | Sevak et al. |
| 2020/0056892 | A1* | 2/2020 | Haque .................... G01C 21/28 |
| 2020/0080865 | A1 | 3/2020 | Ervin |
| 2020/0143710 | A1 | 5/2020 | Zhou et al. |
| 2020/0160712 | A1 | 5/2020 | Beaurepaire et al. |
| 2020/0173796 | A1 | 6/2020 | Beaurepaire et al. |
| 2020/0191576 | A1 | 6/2020 | Zhang et al. |
| 2020/0191591 | A1 | 6/2020 | Zhang et al. |
| 2020/0201354 | A1 | 6/2020 | Beaurepaire et al. |
| 2020/0228645 | A1 | 7/2020 | Alberth, Jr. et al. |
| 2020/0256696 | A1 | 8/2020 | Chopra et al. |
| 2020/0257317 | A1 | 8/2020 | Musk et al. |
| 2020/0314593 | A1* | 10/2020 | Xu ......................... G06N 20/00 |
| 2020/0363217 | A1 | 11/2020 | Zhang et al. |
| 2020/0363231 | A1 | 11/2020 | Pandey |
| 2021/0019376 | A1 | 1/2021 | Neubauer |
| 2021/0044919 | A1 | 2/2021 | Ivanov et al. |
| 2021/0081893 | A1 | 3/2021 | Darmour et al. |
| 2021/0156685 | A1 | 5/2021 | Nagarajan et al. |
| 2021/0163021 | A1 | 6/2021 | Frazzoli et al. |
| 2021/0195112 | A1 | 6/2021 | Verghese et al. |
| 2021/0261331 | A1 | 8/2021 | Otto et al. |
| 2021/0271995 | A1 | 9/2021 | Balu et al. |
| 2021/0285187 | A1 | 9/2021 | Jagoda |
| 2021/0285777 | A1 | 9/2021 | Ostadzadeh et al. |
| 2022/0128695 | A1 | 4/2022 | Koger et al. |
| 2022/0170760 | A1 | 6/2022 | Bennati |
| 2022/0219731 | A1 | 7/2022 | Ran et al. |
| 2023/0251105 | A1 | 8/2023 | Chopra et al. |
| 2023/0384087 | A1 | 11/2023 | Dormody et al. |

OTHER PUBLICATIONS

"U.S. Appl. No. 16/270,040, Examiner Interview Summary mailed Oct. 12, 2022", 2 pgs.
"U.S. Appl. No. 16/270,040, Response filed Oct. 18, 2022 to Non Final Office Action mailed Jun. 20, 2022", 16 pgs.
"U.S. Appl. No. 16/270,040, Notice of Allowance mailed Dec. 29, 2022", 5 pgs.
"U.S. Appl. No. 18/301,456, Non Final Office Action mailed Dec. 21, 2023", 31 pgs.
"U.S. Appl. No. 18/301,456, Examiner Interview Summary mailed May 8, 2024", 2 pgs.
"U.S. Appl. No. 18/301,456, Response filed May 14, 2024 to Non Final Office Action mailed Dec. 21, 2023", 16 pgs.
"U.S. Appl. No. 18/301,456, Notice of Allowance mailed May 30, 2024", 5 pgs.
"U.S. Appl. No. 18/301,456, Corrected Notice of Allowability mailed Jun. 12, 2024", 3 pgs.
"U.S. Appl. No. 18/301,456, 312 Amendment filed Aug. 22, 2024", 10 pgs.
"U.S. Appl. No. 18/301,456, Corrected Notice of Allowability mailed Sep. 5, 2024", 3 pgs.

* cited by examiner

ELEVATION-AWARE HOTSPOT GENERATION SYSTEM

RELATED APPLICATIONS

This application is related to and hereby claims the priority benefit of U.S. Provisional Patent Application No. 62/706,723 filed Sep. 4, 2020, titled "Elevation-Aware Hotspot Generation System," which is incorporated herein by reference in its entirety.

TECHNICAL FIELD

The subject matter disclosed herein generally relates to special-purpose machines configured to generate and provide pickup locations, and to the technologies by which such special-purpose machines become improved compared to other machines that provide pickup locations. Specifically, the present disclosure addresses systems and methods that generate elevation-aware hotspots and recommend one or more elevation-aware hotspots as potential pickup locations.

BACKGROUND

Conventionally, transportation services typically suggest pickup locations when a user makes a request for the transportation service. However, the suggested pickup locations only consider latitude and longitude. That is, the suggestions suffer from a limitation around multi-level roads or structures which frequently occur in complex venues such as airports or dense urban areas.

BRIEF DESCRIPTION OF THE DRAWINGS

Some embodiments are illustrated by way of example and not limitation in the figures of the accompanying drawings.

DETAILED DESCRIPTION

Figure 1:
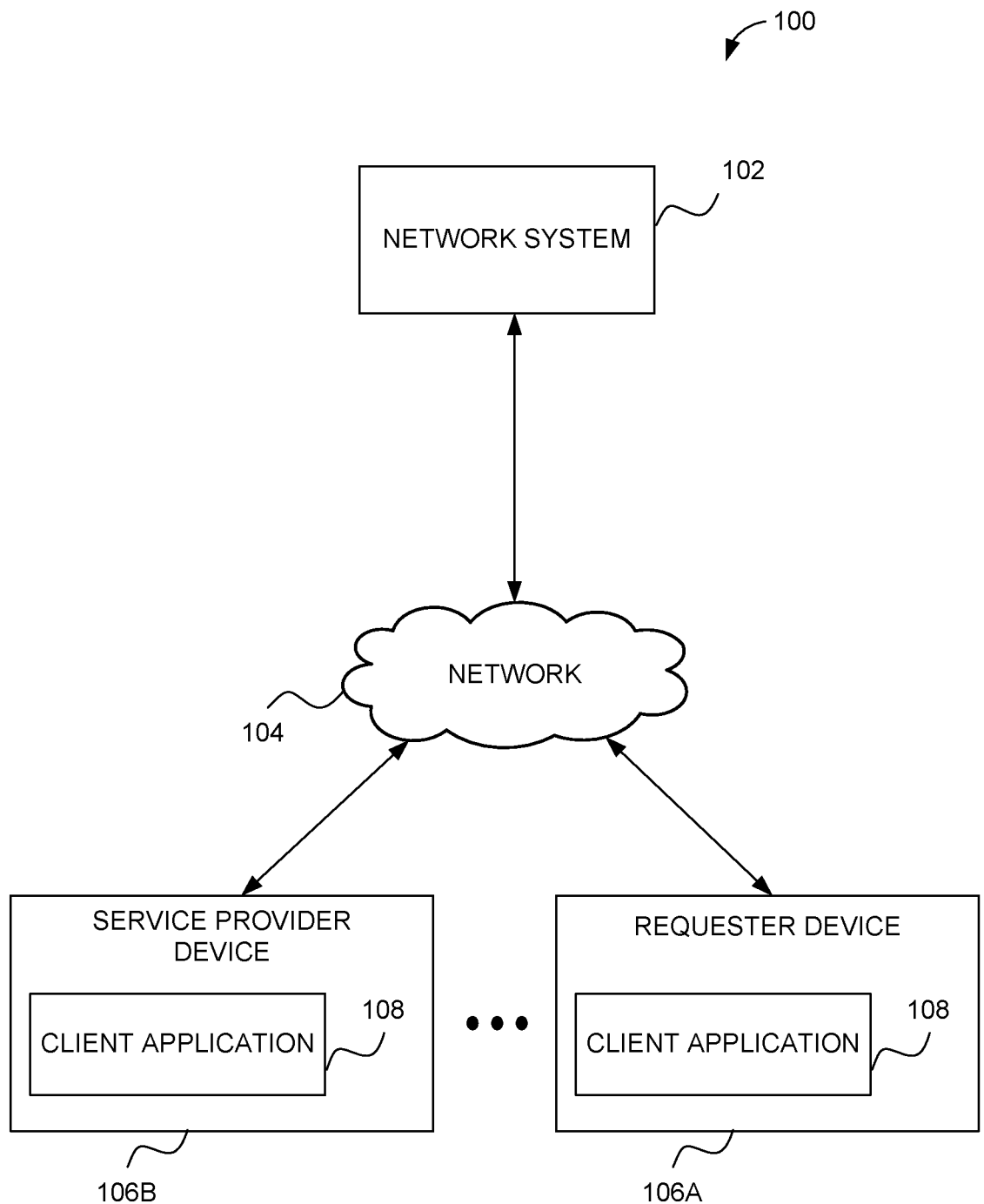
FIG. 1 is a diagram illustrating a network environment suitable for generating elevation-aware hotspots and providing recommendations for pickup locations that consider elevation, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for generating and providing elevation-aware hotspots. Hotspots are popular locations or points previously selected by users of a network system that is determined based on historical data. In example embodiments, the hotspots are popular pickup points that users (e.g., riders) have selected in the past when requesting transportation services.

Conventionally, existing algorithms only consider latitude and longitude in determining hotspots. Elevation or any vertical dimension is not taken into consideration in the algorithms used to generate hotspots. While this may be sufficient in simple cases where there is only a single level to a venue or location, this does not provide adequate pickup locations (also referred to as "pickup points") in large or complex environments such as airports, arenas, or malls that have multiple levels.

For instance, a venue may have two levels whereby many pickup points are located in a particular location on a first level and a different location on a second level. Conventional systems may assume that both locations are on the same level and, in attempting to generate a hotspot, may cluster the pickup points for both locations in an XY-plane. This results in a hotspot that is incorrect and not optimal to either of the two levels. In contrast, example embodiments include a Z-dimension that considers elevation differences in clustering the pickup points and generating the elevation-aware hotspots. Elevation is also considered in determining a recommendation of a pickup point when a subsequent user attempts to request a transportation service.

Accordingly, in example embodiments, a network system performs clustering of common pickup points that consider elevation in order to generate a plurality of elevation-aware hotspots along with a corresponding median telematics vector for each of the plurality of elevation-aware hotspots. In example embodiments, the plurality of elevation-aware hotspots is generated by clustering historical pickup points using a clustering algorithm and a clustering distance function that includes an elevation weight, whereby the elevation weight indicates an amount of influence elevation has in the clustering. The corresponding median telematics vector comprises a median of all telematics vectors corresponding to a hotspot of the plurality of elevation-aware hotspots, whereby a telematics vector comprises indexed signal strengths of Wi-Fi and Bluetooth signal strengths at a time a trip begins. Each of the plurality of elevation-aware hotspots is stored in a geospatial index with the corresponding median telematics vector.

During runtime, the network system receives an indication that a user is initiating a request for transportation service (e.g., user opens a transportation service application on a user device) and identifies a current location of the user device (e.g., latitude and longitude). The network system also receives an indication of one or more signal strengths associated with a user device of the user and determines a user telematics vector from the one or more signal strengths. Based on the current location and the user telematics vector, the network system ranks possible elevation-aware hotspots based on a similarity with the median telematic vector for each nearby hotspot. One or more highest ranked elevation-aware hotspots are identified based on a similarity score between the median telematics vector for each hotspot based on historic data and the current telematics vector for a specific client device. The one or more highest ranked hotspots are presented to the user as a recommended pickup point from which the user can select for the transportation service.

Therefore, example methods (e.g., algorithms) and example systems (e.g., special-purpose machines) are configured to generate elevation-aware hotspots for use in a transportation service. The results are hotspots that are at different locations on different levels of a same complex or venue. During runtime, the example methods and systems access the generated elevation-aware hotspots to identify a best ranked hotspot to recommend as a pickup point. As such, one or more of the methodologies described herein facilitate solving the technical problem of determining and presenting accurate location information for navigation and transportation services that factors in elevation of the complex, venue, or location.

FIG. 1 is a diagram illustrating a network environment 100 suitable for generating and recommending popular pickup locations or hotspots for a transportation service that considers elevation of the venue or location, in accordance with example embodiments. The network environment 100 includes a network system 102 communicatively coupled via a network 104 to a requester device 106a of a user or requester (e.g., rider) and a service provider device 106b of a driver or service provider (collectively or alternatively referred to as "user devices 106" or "client devices 106"). In example embodiments, the network system 102 comprises components that obtain, store, and analyze data received from the user devices 106 in order to determine elevation-aware hotspots. More particularly, the network system 102 determines different hotspots for different levels of a multi-level complex based on various signals received from the user devices 106. The network system 102 also determines a recommendation of one or more potential pickup points (e.g., from the generated elevation-aware hotspots) during runtime. The components of the network system 102 are described in more detail in connection with FIG. 2 and may be implemented in a computer system, as described below with respect to FIG. 6.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities.

The user devices 106 interact with the network system 102 through a client application 108 stored thereon. The client application 108 of the user devices 106 allow for exchange of information with the network system 102 via user interfaces, as well as in background. For example, the client applications 108 running on the user devices 106 may determine and/or provide location information of the user devices 106 (e.g., current location in latitude and longitude), barometer readings, signal strengths (e.g., Wi-Fi and Bluetooth signal strengths), or elevation data, via the network 104, for analysis and storage. In example embodiments, the location information along with barometer readings and signal strengths are used by the network system 102 for generating elevation-aware hotspots and determining recommendations of pickup points that consider elevation of users, as will be discussed in more details below.

In example embodiments, a first user (e.g., a requester or rider) operates the requester device 106a that executes the client application 108 to communicate with the network system 102 to make a request for a transportation service such as transport or delivery service (referred to collectively as a "trip"). In example embodiments, the client application 108 presents, via user interfaces, the recommendation of one or more pickup locations (e.g., of the first user or an item to be delivered) that are elevation-aware hotspots that the first user can select as their pickup point for the transportation service as part of the request.

A second user (e.g., a service provider or driver) operates the service provider device 106b to execute the client application 108 that communicates with the network system 102 to exchange information associated with providing the transportation service (e.g., to the user of the requester device 106a). The client application 108 presents information via user interfaces to the second user of the service provider device 106b, such as invitations to provide the transportation service, navigation instructions (e.g., a route to a pickup point), and pickup and drop-off locations of people or items to be transported. The client application 108 also provides data to the network system 102 such as a current location (e.g., coordinates such as latitude and longitude), barometer readings, speed, and/or signal strengths for various signals associate with the service provider device 106b or vehicle.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of client devices 106 may be embodied within the network environment 100. Furthermore, some components or functions of the network environment 100 may be combined or located elsewhere in the network environment 100. For example, some of the functions of the network system 102 may be embodied within other systems or devices of the network environment 100. Additionally, some of the functions of the client device 106 may be embodied within the network system 102. While only a single network system 102 is shown, alternative embodiments may contemplate having more than one network system 102 to perform server operations discussed herein for the network system 102.

Figure 2:
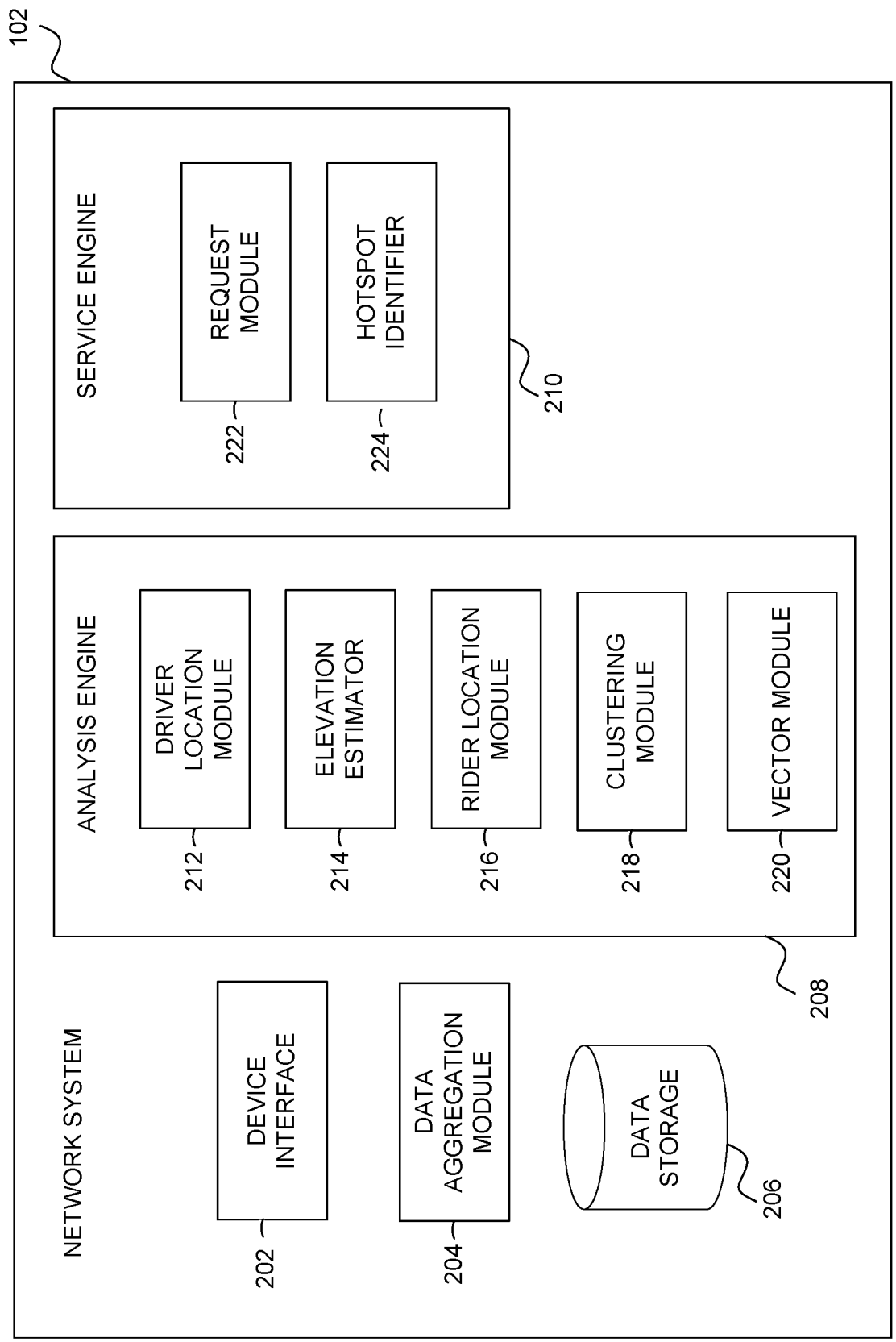
FIG. 2 is a block diagram illustrating components of a network system for generating the elevation-aware hotspots and providing recommendations for pickup locations that consider elevation, according to some example embodiments.

FIG. 2 is a block diagram illustrating components of the network system 102, according to some example embodiments. In various embodiments, the network system 102 obtains and stores trip data (e.g., pickup and drop-off locations) received from the user devices 106 before, during, and after trips and analyzes the trip data to generate elevation-aware hotspots. During runtime, the network system 102 receives location and signal strength data from the requester device 106a and uses the received data to determine one or more hotspots to recommend to the requester as a pickup point for a transportation service. To enable these operations, the network system 102 comprises a device interface 202, a data aggregation module 204, a data storage 206, an analysis engine 208, and a service engine 210 all configured to communicate with each other (e.g., via a bus, shared memory, or a switch). The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the client devices 106 and cause presentation of one or more user interfaces provided by the network system 102 on the client devices 106 (e.g., via the client application 108) including user interfaces to initiate a request for transportation service and select a pickup location. The device interface 202 also receives various trip data from the user devices 106 and provides the trip data to the data aggregation module 204.

The data aggregation module 204 is configured to aggregate the trip data received from the client devices 106. The trip data can include, for example, location data (e.g., latitude and longitude with timestamp), barometer readings, signal strength data associated with user devices 106, speed, times associated with each trip, elevation estimates, and/or cost for the transportation service. The trip data may be received from the client devices 106 in real-time before a trip, as the user is traveling during the trip, and after the trip (e.g., providing feedback). The trip data is stored to the data storage 206 by the data aggregation module 204.

The data storage 206 is configured to store information associated with each user of the network system 102 including the aggregated trip data. The information includes various data used by the network system 102 for determining elevation-aware hotspots and providing a recommendation of one or more hotspots as a potential pickup point during runtime (e.g., when the requester is making a request for transportation service). In some embodiments, the data is stored in, or associated with, a user profile corresponding to each user and includes a history of interactions with the network system 102 (e.g., past trip data). While the data storage 206 is shown to be embodied within the network system 102, alternative embodiments can locate the data storage 206 elsewhere and be communicatively coupled to the network system 102.

The analysis engine 208 comprises components that generate elevation-aware hotspots based on historical data. The elevation-aware hotspots comprise common pickup points or pickup locations on different levels or floors of a complex, venue, or location. In order to generate the elevation-aware hotspots, the analysis engine 208 comprises a driver location module 212, an elevation estimator 214, a rider location module 216, a clustering module 218, and a vector module 220.

The driver location module 212 determines locations based on collected or aggregated driver location estimates (e.g., latitude and longitude; horizontal location). In example embodiments, the driver location module 212 accesses the aggregated trip data for a particular area (e.g., within a predetermined distance of a particular venue or complex) to retrieve the driver location estimates including Wi-Fi and Bluetooth signal strengths, for a range up to and including a time each trip begins for a large number of historical trips. In one embodiment, the range is five minutes, although any range may be used.

In example embodiments, the driver location module 212 runs a map-matching algorithm on the driver location estimates. The map-matching algorithm takes the (recorded or derived) driver location estimates (e.g., GPS data) and relates them to edges or locations in an existing graph or network (e.g., a street graph). In the present example, the driver location estimates are map-matched to a graph associated with the venue associated with the particular area. The driver location module 212 also performs timestamp alignment between the raw driver location estimate and map-matched driver location estimate. Specifically, the driver location module 212 groups each map-matched driver location estimate with a nearest raw driver location estimate by timestamp.

The elevation estimator 214 is configured to determine an elevation estimate. As such, the elevation estimator 214 determines the elevation using existing methods based on the barometer reading from the device. The elevation estimator 214 then calculates the difference between the elevation estimate based on the barometer reading of the driver location and a known elevation of the map-matched driver location. The elevation estimator 214 then determines a per-trip median difference for a time window up to the beginning trip point (e.g., when the driver arrives at the pickup point and the rider enters a vehicle of the driver). This per-trip median is the elevation calibration constant. The elevation estimator 214 then determines a calibrated elevation estimate as a sum of the elevation of the driver location estimate at the beginning of the trip and the elevation calibration constant.

In some case, the elevation estimator 214 relies on barometer sensors that are on most smartphones. However, these barometer sensors tend to be poorly calibrated resulting in baseline average estimates that tend to be different for the same location. As a result, the raw values that are received from the barometer sensors are unreliable. Nevertheless, the relative changes tend to be more consistent across devices. Example embodiments can use barometer sensor readings over time and known elevations from map-matched location estimates to calibrate driver barometer readings. Elevation estimates are generally available on the base map and can be relied upon when the driver is on ordinary roads. In multi-level venues where elevation estimates are most needed, however, these elevation estimates are frequently unreliable or unavailable for each level of the roadway. Example embodiments use elevation data, where available, to calibrate the barometer readings to generate more accurate elevation estimates where elevation map data is not available or unreliable. Thus, when a driver goes to a multi-level venue, the elevation estimator 214 will have a baseline reading. As the driver proceeds up a ramp to a different level, the elevation estimator 214 generates an estimate of that elevation as a difference of a barometer reading at a higher point compared to a baseline measurement.

In other embodiments, the Wi-Fi and Bluetooth signal strengths are used to derive elevation. For instance, if there are a plurality of riders on one level and the riders have strong Wi-Fi signals (e.g., associated with a particular base station) and a driver comes along and matches the signal strength (e.g., strong reading from the base station), the elevation estimator 214 is confident the driver is on a same level as the riders. Additionally, at a venue with a plurality of Wi-Fi base stations (e.g., an airport with base stations every 20 meters along each level), a service provider device 106b (e.g., driver's phone) can pick up the Wi-Fi readings and publish the base station identifier (with a known location)—providing another indicator of an elevation estimate.

The rider location module 216 manages rider location and elevation data. In example embodiments, the rider location module 216 accesses trip data associated with last known rider location estimates at the time the trips begins. The accessed trip data includes Wi-Fi and Bluetooth signal strength when available. In some cases, the accessed trip data also includes derived estimates of elevation (e.g., in meters), floor level, and/or vertical accuracy (e.g., estimate of how reliable the elevation estimate is; standard deviation of the elevation). With respect to the floor level, operating systems of the requester device 106a may have access to highly detailed maps with Bluetooth/Wi-Fi base stations and can publish a floor level estimate for the rider. The rider location module 216 removes all trips for which there is no recent rider location estimate (e.g., background location information is not collected from the rider) within a time threshold (e.g., 60 seconds). Additionally, the rider location module 216 removes trips for which a distance between the last known locations of the rider and the driver when the trip begins is greater than a threshold distance. In one embodiment, the threshold distance is 50 meters.

The clustering module 218 performs clustering with the remaining trip data (e.g., after the rider location module 216 removes outlier trips). A clustering algorithm requires a distance in between every data point (e.g., pickup point). Conventionally, that distance is a distance in meters between a first pickup point and a second pickup point, assuming everything is flat. Example embodiments propose to also consider elevation in the clustering algorithm. In example embodiments, a clustering distance that considers elevation is set/defined for the clustering module 218. In one embodiment, the clustering distance is set as follows:

Set clustering_distance(point1,point2)= elevation_weight*abs (point1.calibrated_elevation_estimate− point2.calibrated_elevation_estimate)+(1−elevation_weight)*haversine(point1,point2).

Point1 represents the first pickup point, while point2 represents the second pickup point. The elevation_weight is a tunable parameter between 0 and 1. At elevation_weight=0, hotspot generation does not take elevation into consideration, which results in no change from conventional systems. At elevation_weight=1, hotspots will be clustered purely on elevation and not on horizontal locations. Therefore, elevation_weight should be selected between a range of 0 to 1. In one instance, elevation_weight is set to 0.2, which results in elevation difference accounting for 20% of the distance between the two pickup points.

To provide more context to the equation presented above, assume Haversine=flat distance on a map and elevation_weight=0.2.

Clustering without elevation (convention implementation): clustering_distance=haversine(pickup1, pickup2)

Elevation-Only clustering: clustering_distance=elevation_difference (pickup1, pickup2)

Even-weighting hybrid: clustering_distance=haversine(pickup1, pickup2)+elevation_difference(pickup1,pickup2)

Example Uneven-weighting hybrid where elevation_weight=0.2: clustering_distance=0.8*haversine (pickup1,pickup2)+0.2*elevation_difference (pickup1,pickup2).

The clustering module 218 clusters historical pickup points using a clustering algorithm and the above clustering distance function to identify elevation-aware hotspots (e.g., clustering in three-dimensional space). In one embodiment, the clustering module 218 uses DBSCAN. However, it is noted that any clustering technique can be used in various embodiments (e.g., K-means clustering, hierarchical clustering).

The vector module 220 is configured to generate telematics vectors. The telematics vectors are the indexed signal strengths (RSSI) of nearby Wi-Fi and Bluetooth access points as observed by the requester device 106a at the time the trip begins. For example, if the requester device 106a observes two Wi-Fi access points, "wifi_access_point_1" and "wifi_access_point_2" and one Bluetooth access point, "bluetooth_access_point_1", the telematics vector has three elements and be composed as: [wifi_station_1_signal_strength, wifi_station_2_signal_strength, bluetooth_station_1_signal_strength]. Note that the unique identifiers of each telematics vector element should be preserved to enable comparisons between them. The vector module 220 filters out transient access points that are not observed by requester devices 106a over a medium-term time horizon to increase the likelihood that these access points are relatively permanent. The filtering is to stations that are observed over at least 28 days at a single location in one embodiment. The vector module 220 then determines a median of the telematics vectors of all rider telematics vectors associated with each elevation-aware hotspot identified by the clustering module 218.

The elevation-aware hotspots determined by the clustering module 218 are stored (e.g., in the data storage 206) along with their corresponding median telematics vector. In one embodiment, the elevation-aware hotspots are stored in a geospatial index with the corresponding median telematics vector.

The service engine 210 is configured to manage a transportation service request during runtime. Accordingly, the service engine 210 comprises a request module 222 and a hotspot identifier 224. The service engine 210 may comprise other components (not shown) for managing a transportation service including assigning service providers (e.g., drivers, couriers) to a transportation service request and providing routes to a destination associated with the transportation service request.

The request module 222 manages the transportation service request. In example embodiments, the request module 222 detects or receives an indication that a user is initiating a request for a transportation service at the requester device 106a. For example, the request module 222 can detect that the user opens the client application 108 and initiates a request for transportation service (e.g., selects a destination). The request module 222 also receives a current location of the requester device 106a along with signal strengths detected by the requester device 106a.

The hotspot identifier 224 manages providing a recommendation of one or more elevation-aware hotspots as potential pickup points for the transportation service request. In one embodiment, the hotspot identifier 224 works with the vector module 220 to determine the user's current telematics vector (e.g., telematics vector of a user device of the user). The vector module 220 may comprise a library that is invoked by the clustering module 218 as well as by the hotspot identifier 224 for online retrieval and serving. Based on the user's current telematics vector and current location (e.g., in an XY-plane; horizontal location) of the user, the hotspot identifier 224 accesses the geospatial index of elevation-aware hotspots and corresponding telematics vectors. The hotspot identifier 224 then ranks the nearby hotspots by a cosine similarity of the user's current telemetric vector and the median telematics vector of each nearby hotspot. The hotspot identifier 224 selects a top ranked hotspot (or top ranked hotspots) for the pickup point recommendation.

The request module 222 provides (e.g., via the device interface 202) the recommendation of the one or more hotspots identified by the hotspot identifier 224 to the client device 106 (e.g., requester device 106a) as pickup point recommendations. The client application 108 may display the pickup point recommendation as the user is requesting the transportation service. For example, the client application 108 can present the recommendations on a map or a drop-down list from which the user can select one of the recommended pickup points as the location where the trip will begin (e.g., the user will meet the service provider).

A selection of a pickup point is then received by the request module 222 and a transportation service is established by the request module 222. Establishing the transportation service includes assigning a service provider to the transportation service and providing navigation instructions (e.g., map, turn-by-turn instructions) to the service provider device 106b to navigate to the pickup point and, subsequently, to the destination.

Figure 3:
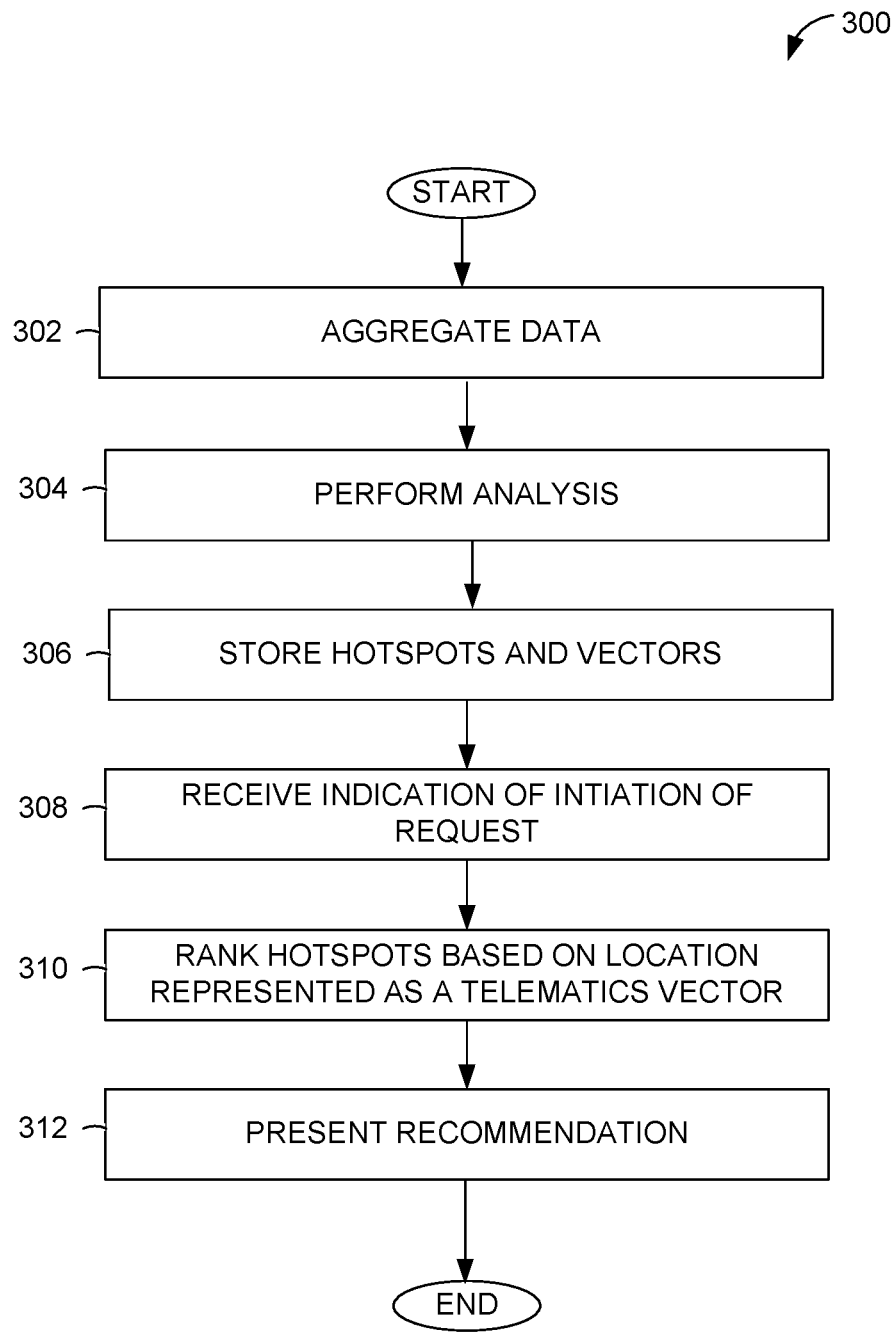
FIG. 3 is a flowchart illustrating operations of a method for generating elevation-aware hotspots and recommending a pickup point selected from the elevation-aware hotspots, according to some example embodiments.

FIG. 3 is a flowchart illustrating operations of a method 300 for generating the elevation-aware hotspots and recommending a pickup point selected from the elevation-aware hotspots, according to some example embodiments. Operations in the method 300 may be performed by the network system 102, using components described above with respect to FIG. 2. Accordingly, the method 300 is described by way of example with reference to the network system 102. However, it shall be appreciated that at least some of the operations of the method 300 may be deployed on various other hardware configurations or be performed by similar components residing elsewhere in the network environment 100. Therefore, the method 300 is not intended to be limited to the network system 102.

In operation 302, the data aggregation module 204 aggregates trip data. The trip data can include, for example, location data (e.g., latitude and longitude with timestamp), barometer readings, signal strength data associated with user devices 106, speed, times associated with each trip, and/or feedback for the transportation service. The trip data may be received from the client devices 106 in real-time before a trip, during the trip, and after the trip. The data aggregation module 204 stores the trip data to the data storage 206.

In operation 304, the analysis engine 208 performs analysis on the aggregated data to generate elevation-aware hotspots for various locations and venues. In example embodiments, the analysis may occur at any time or at predetermined times or intervals (e.g., every night, once a week), when a certain amount of trip data has been aggregated, or be triggered manually by an operator of the network system 102. Operation 304 will be discussed in more detail in connection with FIG. 4 below.

In operation 306, the analysis engine 208 stores the generated elevation-aware hotspots along with corresponding median telematics vector for use during runtime. In one embodiment, the elevation-aware hotspots are stored in a geospatial index with the corresponding median telematics vector.

In operation 308, the service engine 210 (e.g., request module 222) receives an indication that a user is initiating a request for a transportation service at their requester device 106a. For example, the request module 222 can detect that the user opens the client application 108 and is initiating a request for transportation service by selecting a destination to which to travel. The request module 222 also receives a current location of the requester device 106a along with signal strengths detected by the requester device 106a in operation 308.

In operation 310, the hotspot identifier 224 ranks hotspots based on the user current location and signal strengths. In one embodiment, the hotspot identifier 224 determines the user's current telematics vector based on the signal strengths. Based on the user's current telematics vector and the current location of the user, the hotspot identifier 224 accesses the geospatial index of elevation-aware hotspots and corresponding telematics vectors. The hotspot identifier 224 then ranks the nearby hotspots by a cosine similarity of the user's current telemetric vector and the median telematics vector of each nearby hotspot. The hotspot identifier 224 selects a top ranked hotspot (or top ranked hotspots) for a pickup point recommendation.

In operation 312, the request module 222 (e.g., via the device interface 202) presents the recommendation of the one or more hotspots identified by the hotspot identifier 224. The recommendation is presented in a user interface on the requester device 106a via the client application 108. As a result, the client application 108 may display the pickup point recommendation as the user is requesting the transportation service (e.g., on a map or a drop-down list) and the user can select one of the recommended pickup points as the location where their trip will begin (e.g., where the user will meet the service provider).

Figure 4:
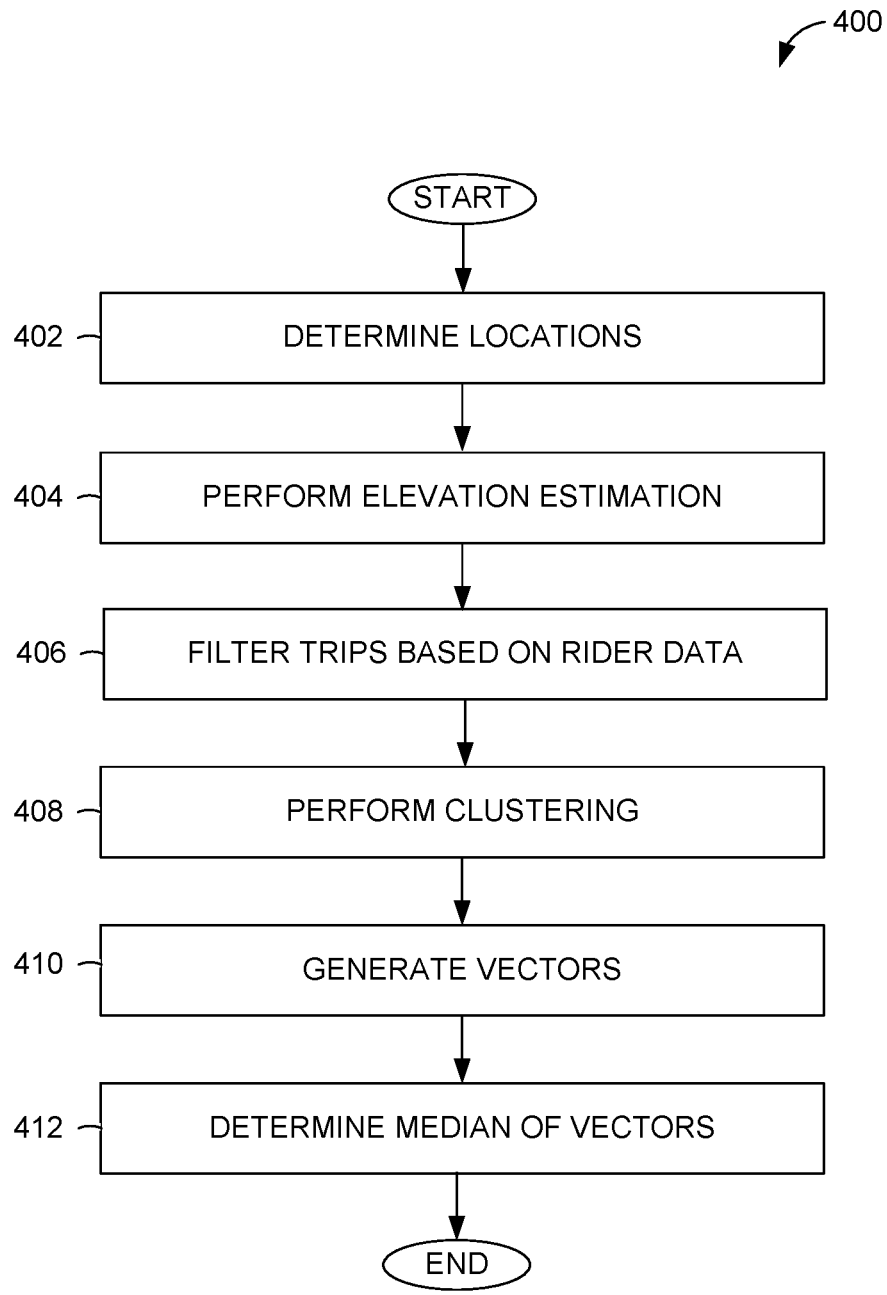
FIG. 4 is a flowchart illustrating operations of a method for performing an elevation-aware hotspot analysis, according to some example embodiments.

FIG. 4 is a flowchart illustrating operations of a method 400 for performing elevation-aware hotspot analysis (operation 304), according to some example embodiments. Operations in the method 400 may be performed by the analysis engine 208 of the network system 102. Accordingly, the method 400 is described by way of example with reference to the analysis engine 208. However, it shall be appreciated that at least some of the operations of the method 400 may be deployed on various other hardware configurations or be performed by similar components residing elsewhere in the network environment 100. Therefore, the method 400 is not intended to be limited to the analysis engine 208.

In operation 402, the driver location module 212 determines locations based on aggregated driver location estimates (e.g., latitude and longitude). In example embodiments, the driver location module 212 accesses the aggregated trip data for a particular area and retrieves the driver location estimates and Wi-Fi and Bluetooth signal strengths for a range up to and including a time each trip begins for a large number of historical trips. The driver location module 212 then runs a map-matching algorithm on the driver location estimates. The map-matching algorithm takes the (recorded) driver location estimates (e.g., GPS data) and relate them to edges or locations in an existing graph or network (e.g., a street graph). The driver location module 212 also performs timestamp alignment between the raw and map-matched driver locations. Specifically, the driver location module 212 groups each map-matched location with a nearest raw location by timestamp.

In operation 404, the elevation estimator 214 performs elevation estimation for the driver locations. Operation 404 will be discussed in more detail in connection with FIG. 5 below.

In operation 406, the rider location module 216 filters out trips based on rider location data prior to clustering. In example embodiments, the rider location module 216 accesses trip data associated with last known rider location estimates at the time the trips begin. The accessed trip data includes Wi-Fi and Bluetooth signal strength when available. The rider location module 216 removes all trips for which there is no recent rider location estimate (e.g., background location information is not collected from the rider) within a time threshold (e.g., 60 seconds). Additionally, the rider location module 216 removes trips for which a distance between the last known locations of the rider and the driver when the trip begins is greater than a threshold distance (e.g., 50 meters).

In operation 408, the clustering module 218 performs clustering with the remaining trip data. In one embodiment, a clustering distance function is defined that includes an elevation weight, which is tunable. A higher elevation weight will emphasize clustering based on elevation more than on horizontal locations. The clustering module 218 then clusters historical pickup points using a clustering algorithm (e.g., DBSCAN) and the clustering distance function to identify elevation-aware hotspots.

In operation 410, the vector module 220 generates telematics vectors. The telematics vectors are indexed signal strengths of the rider Wi-Fi and Bluetooth signal strengths (for various base stations) at the time the trip begins. For example: [wifi_station_1_signal_strength, wifi_station_2_signal_strength, bluetooth_station_1_signal_strength, etc.].

In operation 412, the vector module 220 determines a median of the telematics vectors of all rider telematics vectors associated with each elevation-aware hotspot identified by the clustering module 218.

Figure 5:
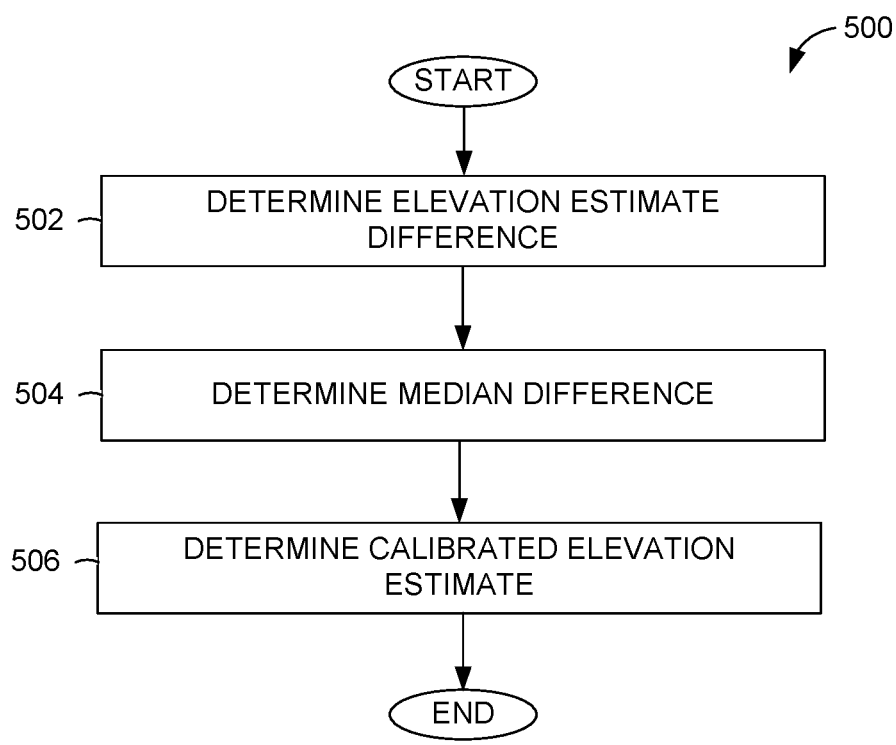
FIG. 5 is a flowchart illustrating operations of a method for performing estimation as part of the elevation-aware hotspot analysis, according to some example embodiments.

FIG. 5 is a flowchart illustrating operations of a method 500 for performing elevation estimation as part of the elevation-aware hotspot analysis (operation 404), according to some example embodiments. Operations in the method 500 may be performed by the analysis engine 208. Accordingly, the method 500 is described by way of example with reference to the analysis engine 208. However, it shall be appreciated that at least some of the operations of the method 500 may be deployed on various other hardware configurations or be performed by similar components residing elsewhere in the network environment 100. Therefore, the method 500 is not intended to be limited to the analysis engine 208.

In operation 502, the elevation estimator 214 determines an elevation estimate difference between an elevation estimate of the raw driver location and an elevation of the map-matched driver location. In one embodiment, the elevation estimator 214 determines the elevation using existing methods based on the barometer reading from the service provider device 106b. The elevation estimator 214 then calculates the difference between the elevation estimate based on the barometer reading of the driver location and a known elevation of the map-matched driver location.

In operation 504, the elevation estimator 214 determines the median between each of the time-aligned raw and map-matched elevation differences for a time window up to the beginning trip point (e.g., when the driver arrives at the pickup point and the rider enters a vehicle of the driver). The resulting per-trip median is the elevation calibration constant.

Figure 6:
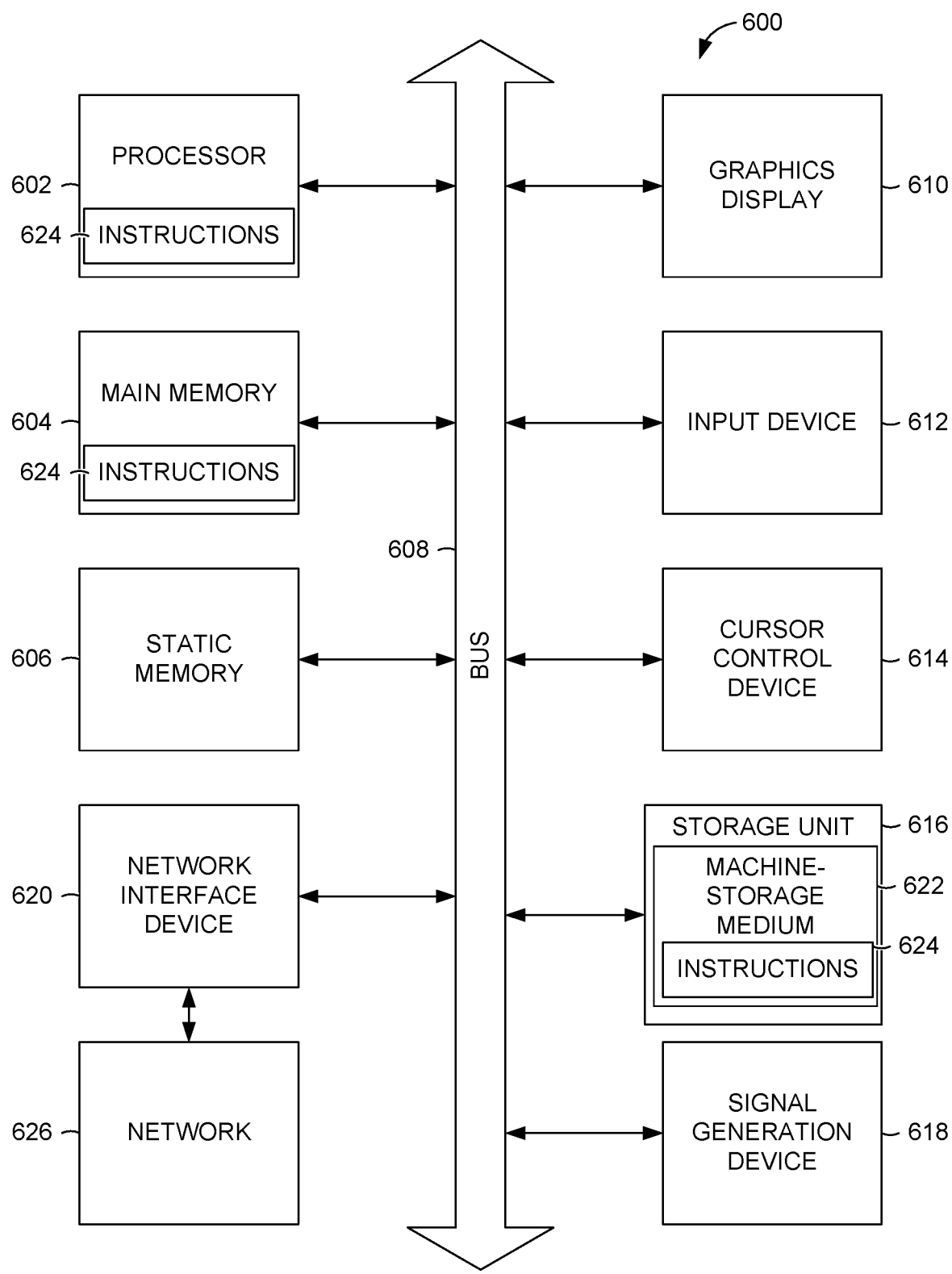
FIG. 6 is a block diagram illustrating components of a machine, according to some example embodiments, able to read instructions from a machine-storage medium and perform any one or more of the methodologies discussed herein.

In operation 506, elevation estimator 214 determines a calibrated elevation estimate. In one embodiment, the calibrated elevation estimate is a sum of an elevation of the raw driver location estimate at the beginning of the trip and the elevation calibration constant. This operation reduces the bias of the raw elevation estimates from the driver devices FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIGS. 3-5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for generating and providing elevation-aware hotspots. The method comprises detecting, by a hardware processor of a network system, an initiation of a request for a transportation service at a client device of a user; receiving an indication of a location of the client device and corresponding signal strengths associated with the client device; determining a telematics vector based on the signal strengths associated with the client device; based on the location of the client device and the telematics vector associated with the client device, identifying one or more top ranked elevation-aware hotspots; and causing, by the network system on a user interface on the client device of the user, presentation of a pickup point recommendation that includes the one or more top ranked elevation-aware hotspots.

In example 2, the subject matter of example 1 can optionally include wherein the identifying the one or more top ranked elevation-aware hotspots comprises ranking nearby hotspots within a predetermined distance of the location of the client device based on a cosine similarity of a telemetric vector associated with the client device and a median telematics vector of each nearby hotspot.

In example 3, the subject matter of any of examples 1-2 can optionally include generating a plurality of elevation-aware hotspots and a corresponding median telematics vector for each of the plurality of elevation-aware hotspots; and storing each of the plurality of elevation-aware hotspots in a geospatial index with the corresponding median telematics vector.

In example 4, the subject matter of any of examples 1-3 can optionally include wherein generating the plurality of elevation-aware hotspots comprises clustering historical pickup points using a clustering algorithm and a clustering distance function that includes an elevation weight, the elevation weight indicating an amount of influence elevation has in the clustering.

In example 5, the subject matter of any of examples 1-4 can optionally include wherein the corresponding median telematics vector comprises a median of all telematics vectors associated with a corresponding hotspot of the plurality of elevation-aware hotspots, each telematics vector being indexed signal strengths of Wi-Fi and Bluetooth signal strengths at a time a trip begins.

In example 6, the subject matter of any of examples 1-5 can optionally include wherein the generating the plurality of elevation-aware hotspots comprises determining driver locations from aggregated trip data; and performing elevation estimation based on the driver locations.

In example 7, the subject matter of any of examples 1-6 can optionally include wherein the determining the driver locations comprises retrieving aggregated driver location estimates from the aggregated trip data for a particular area; and running a map-matching algorithm on the driver location estimates by relating the driver location estimate to edges or locations in an existing graph.

In example 8, the subject matter of any of examples 1-7 can optionally include wherein the performing elevation estimation comprises determining an elevation estimate difference between an elevation estimate of a driver location and an elevation of a map-matched driver location; determining a per-trip median difference for a time window up to a beginning of a trip; and determining a calibrated elevation estimate by summing the elevation estimate of the driver location at the beginning of the trip and an elevation calibration constant.

In example 9, the subject matter of any of examples 1-9 can optionally include wherein the elevation estimate of the driver location is determined using a barometer reading accessed from a device of a driver.

Example 10 is a system for generating and providing elevation-aware hotspots. The system includes one or more processors and a memory storing instructions that, when executed by the one or more hardware processors, causes the one or more hardware processors to perform operations comprising detecting, by a network system, an initiation of a request for a transportation service at a client device of a user; receiving an indication of a location of the client device and corresponding signal strengths associated with the client device; determining a telematics vector based on the signal strengths associated with the client device; based on the location of the client device and the telematics vector associated with the client device, identifying one or more top ranked elevation-aware hotspots; and causing, by the network system on a user interface on the client device of the user, presentation of a pickup point recommendation that includes the one or more top ranked elevation-aware hotspots.

In example 11, the subject matter of example 10 can optionally include wherein the identifying the one or more top ranked elevation-aware hotspots comprises ranking nearby hotspots within a predetermined distance of the location of the client device based on a cosine similarity of a telemetric vector associated with the client device and a median telematics vector of each nearby hotspot.

In example 12, the subject matter of any of examples 10-11 can optionally include wherein the operations further comprise generating a plurality of elevation-aware hotspots and a corresponding median telematics vector for each of the plurality of elevation-aware hotspots; and storing each of the plurality of elevation-aware hotspots in a geospatial index with the corresponding median telematics vector.

In example 13, the subject matter of any of examples 10-12 can optionally include wherein generating the plurality of elevation-aware hotspots comprises clustering historical pickup points using a clustering algorithm and a clustering distance function that includes an elevation weight, the elevation weight indicating an amount of influence elevation has in the clustering.

In example 14, the subject matter of any of examples 10-13 can optionally include wherein the corresponding median telematics vector comprises a median of all telematics vectors associated with a corresponding hotspot of the plurality of elevation-aware hotspots, each telematics vector being indexed signal strengths of Wi-Fi and Bluetooth signal strengths at a time a trip begins.

In example 15, the subject matter of any of examples 10-14 can optionally include wherein the generating the plurality of elevation-aware hotspots comprises determining driver locations from aggregated trip data; and performing elevation estimation based on the driver locations.

In example 16, the subject matter of any of examples 10-15 can optionally include wherein the determining the driver locations comprises retrieving aggregated driver location estimates from the aggregated trip data for a particular area; and running a map-matching algorithm on the driver location estimates by relating the driver location estimate to edges or locations in an existing graph.

In example 17, the subject matter of any of examples 10-16 can optionally include wherein the performing elevation estimation comprises determining an elevation estimate difference between an elevation estimate of a driver location and an elevation of a map-matched driver location; determining a per-trip median difference for a time window up to a beginning of a trip; and determining a calibrated elevation estimate by summing the elevation estimate of the driver location at the beginning of the trip and an elevation calibration constant In example 18, the subject matter of any of examples 10-17 can optionally include wherein the elevation estimate of the driver location is determined using a barometer reading accessed from a device of a driver.

Example 19 is a machine-storage medium storing instructions for providing high dimension copresence estimation. The machine-storage medium configures one or more processors to perform operations comprising detecting, by a network system, an initiation of a request for a transportation service at a client device of a user; receiving an indication of a location of the client device and corresponding signal strengths associated with the client device; determining a telematics vector based on the signal strengths associated with the client device; based on the location of the client device and the telematics vector associated with the client device, identifying one or more top ranked elevation-aware hotspots; and causing, by the network system on a user interface on the client device of the user, presentation of a pickup point recommendation that includes the one or more top ranked elevation-aware hotspots.

In example 20, the subject matter of example 19 can optionally include wherein the identifying the one or more top ranked elevation-aware hotspots comprises ranking nearby hotspots within a predetermined distance of the location of the client device based on a cosine similarity of a telemetric vector associated with the client device and a median telematics vector of each nearby hotspot.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   detecting, by a hardware processor of a network system, an initiation of a request for a transportation service at a client device of a user;
   receiving an indication of a location of the client device and corresponding signal strengths of nearby Wi-Fi and Bluetooth access points observed by the client device;
   determining a telematics vector associated with the client device based on the signal strengths of nearby Wi-Fi and Bluetooth access points;
   based on the location of the client device and the telematics vector associated with the client device, identifying one or more top ranked elevation-aware hotspots; and
   causing, by the network system on a user interface on the client device of the user, presentation of a pickup point recommendation that includes the one or more top ranked elevation-aware hotspots.

2. The method of claim 1, wherein the identifying the one or more top ranked elevation-aware hotspots comprises ranking nearby hotspots within a predetermined distance of the location of the client device based on a cosine similarity of a telemetric vector associated with the client device and a median telematics vector of each nearby hotspot.

3. The method of claim 1, further comprising:
   generating a plurality of elevation-aware hotspots and a corresponding median telematics vector for each of the plurality of elevation-aware hotspots; and
   storing each of the plurality of elevation-aware hotspots in a geospatial index with the corresponding median telematics vector.

4. The method of claim 3, wherein generating the plurality of elevation-aware hotspots comprises clustering historical pickup points using a clustering algorithm and a clustering distance function that includes an elevation weight, the elevation weight indicating an amount of influence elevation has in the clustering.

5. The method of claim 3, wherein the corresponding median telematics vector comprises a median of all telematics vectors associated with a corresponding hotspot of the plurality of elevation-aware hotspots, each telematics vector being indexed signal strengths of Wi-Fi and Bluetooth signal strengths at a time a trip begins.

6. The method of claim 3, wherein the generating the plurality of elevation-aware hotspots comprises:
determining driver locations from aggregated trip data; and
performing elevation estimation based on the driver locations.

7. The method of claim 6, wherein the determining the driver locations comprises:
retrieving aggregated driver location estimates from the aggregated trip data for a particular area; and
running a map-matching algorithm on the driver location estimates by relating the driver location estimate to edges or locations in an existing graph.

8. The method of claim 6, wherein the performing elevation estimation comprises:
determining an elevation estimate difference between an elevation estimate of a driver location and an elevation of a map-matched driver location;
determining a per-trip median difference for a time window up to a beginning of a trip; and
determining a calibrated elevation estimate by summing the elevation estimate of the driver location at the beginning of the trip and an elevation calibration constant.

9. The method of claim 8, wherein the elevation estimate of the driver location is determined using a barometer reading accessed from a device of a driver.

10. A system comprising:
one or more hardware processors; and
memory storing instructions that, when executed by the one or more hardware processors, cause the one or more hardware processors to perform operations comprising:
detecting, by a network system, an initiation of a request for a transportation service at a client device of a user;
receiving an indication of a location of the client device and corresponding signal strengths of nearby Wi-Fi and Bluetooth access points observed by the client device;
determining a telematics vector associated with the client device based on the signal strengths of the nearby Wi-Fi and Bluetooth access points;
based on the location of the client device and the telematics vector associated with the client device, identifying one or more top ranked elevation-aware hotspots; and
causing, by the network system on a user interface on the client device of the user, presentation of a pickup point recommendation that includes the one or more top ranked elevation-aware hotspots.

11. The system of claim 10, wherein the identifying the one or more top ranked elevation-aware hotspots comprises ranking nearby hotspots within a predetermined distance of the location of the client device based on a cosine similarity of a telemetric vector associated with the client device and a median telematics vector of each nearby hotspot.

12. The system of claim 10, wherein the operations further comprise:
generating a plurality of elevation-aware hotspots and a corresponding median telematics vector for each of the plurality of elevation-aware hotspots; and
storing each of the plurality of elevation-aware hotspots in a geospatial index with the corresponding median telematics vector.

13. The system of claim 12, wherein generating the plurality of elevation-aware hotspots comprises clustering historical pickup points using a clustering algorithm and a clustering distance function that includes an elevation weight, the elevation weight indicating an amount of influence elevation has in the clustering.

14. The system of claim 12, wherein the corresponding median telematics vector comprises a median of all telematics vectors associated with a corresponding hotspot of the plurality of elevation-aware hotspots, each telematics vector being indexed signal strengths of Wi-Fi and Bluetooth signal strengths at a time a trip begins.

15. The system of claim 12, wherein the generating the plurality of elevation-aware hotspots comprises:
determining driver locations from aggregated trip data; and
performing elevation estimation based on the driver locations.

16. The system of claim 15, wherein the determining the driver locations comprises:
retrieving aggregated driver location estimates from the aggregated trip data for a particular area; and
running a map-matching algorithm on the driver location estimates by relating the driver location estimate to edges or locations in an existing graph.

17. The system of claim 15, wherein the performing elevation estimation comprises:
determining an elevation estimate difference between an elevation estimate of a driver location and an elevation of a map-matched driver location;
determining a per-trip median difference for a time window up to a beginning of a trip; and
determining a calibrated elevation estimate by summing the elevation estimate of the driver location at the beginning of the trip and an elevation calibration constant.

18. The system of claim 17, wherein the elevation estimate of the driver location is determined using a barometer reading accessed from a device of a driver.

19. A machine-storage medium storing instructions that, when executed by one or more hardware processors of a machine, cause the machine to perform operations comprising:
detecting, by a network system, an initiation of a request for a transportation service at a client device of a user;
receiving an indication of a location of the client device and corresponding signal strengths of nearby Wi-Fi and Bluetooth access points observed by the client device;
determining a telematics vector associated with the client device based on the signal strengths of the nearby Wi-Fi and Bluetooth access points;
based on the location of the client device and the telematics vector associated with the client device, identifying one or more top ranked elevation-aware hotspots; and
causing, by the network system on a user interface on the client device of the user, presentation of a pickup point recommendation that includes the one or more top ranked elevation-aware hotspots.

20. The machine-storage medium of claim 19, wherein the identifying the one or more top ranked elevation-aware hotspots comprises ranking nearby hotspots within a predetermined distance of the location of the client device based on a cosine similarity of a telemetric vector associated with the client device and a median telematics vector of each nearby hotspot.

* * * * *